(12) United States Patent
Elsner et al.

(10) Patent No.: US 7,767,130 B2
(45) Date of Patent: Aug. 3, 2010

(54) METHOD AND DEVICE FOR PRODUCTION OF A THREE-DIMENSIONAL ARTICLE

(75) Inventors: Philip Elsner, Bergfelde (DE); Stefan Dreher, Berlin (DE); Ingo Ederer, Pflaumdorf (DE); Brigitte Voit, Dresden (DE); Janke Gudrun, Regen (DE); Michael Stephan, Dresden (DE)

(73) Assignee: Voxeljet Technology GmbH, Augsburg (DE)

( * ) Notice: Subject to any disclaimer, the term of this patent is extended or adjusted under 35 U.S.C. 154(b) by 392 days.

(21) Appl. No.: 11/569,537

(22) PCT Filed: May 24, 2005

(86) PCT No.: PCT/DE2005/000950

§ 371 (c)(1),
(2), (4) Date: Aug. 2, 2007

(87) PCT Pub. No.: WO2005/113219

PCT Pub. Date: Dec. 1, 2005

(65) Prior Publication Data

US 2008/0233302 A1    Sep. 25, 2008

(30) Foreign Application Priority Data

May 24, 2004   (DE) .................. 10 2004 025 374

(51) Int. Cl.
*B28B 1/16* (2006.01)
(52) U.S. Cl. ......................... 264/308; 264/113
(58) Field of Classification Search .................. 264/308, 264/113

See application file for complete search history.

(56) References Cited

U.S. PATENT DOCUMENTS 4,247,508 A    1/1981   Housholder (Continued)

FOREIGN PATENT DOCUMENTS

AU    720255 B2    5/2000

(Continued)

OTHER PUBLICATIONS

Cima et al., "Computer-derived Microstructures by 3D Printing: Bio- and Structural Materials," SFF Symposium, Austin, TX, 1994.

(Continued)

*Primary Examiner*—Joseph S. Del Sole
*Assistant Examiner*—John P Robitaille
(74) *Attorney, Agent, or Firm*—Dobrusin & Thennisch PC

(57) ABSTRACT

The invention relates to a method and device for production of a three-dimensional article from a material, by means of layered application. According to the invention, a dropwise application is carried out, whereby drops of reaction components are ejected by a nozzle arrangement (3) and applied to a base reaction component (2), arranged on a substrate (1). The material for the three-dimensional article is formed in layers, with reaction of the base reaction component (2) with reaction components on contact, whereby the material is formed on a reaction of the base reaction component with one of the reaction components to give a material with one material property and on another reaction of the base reaction component with another of the reaction components to give a material with another material property. On production of the three-dimensional article, an article section is produced in which a gradual transition between the one material property and the other material property is generated.

20 Claims, 4 Drawing Sheets

U.S. PATENT DOCUMENTS

Figure 1:
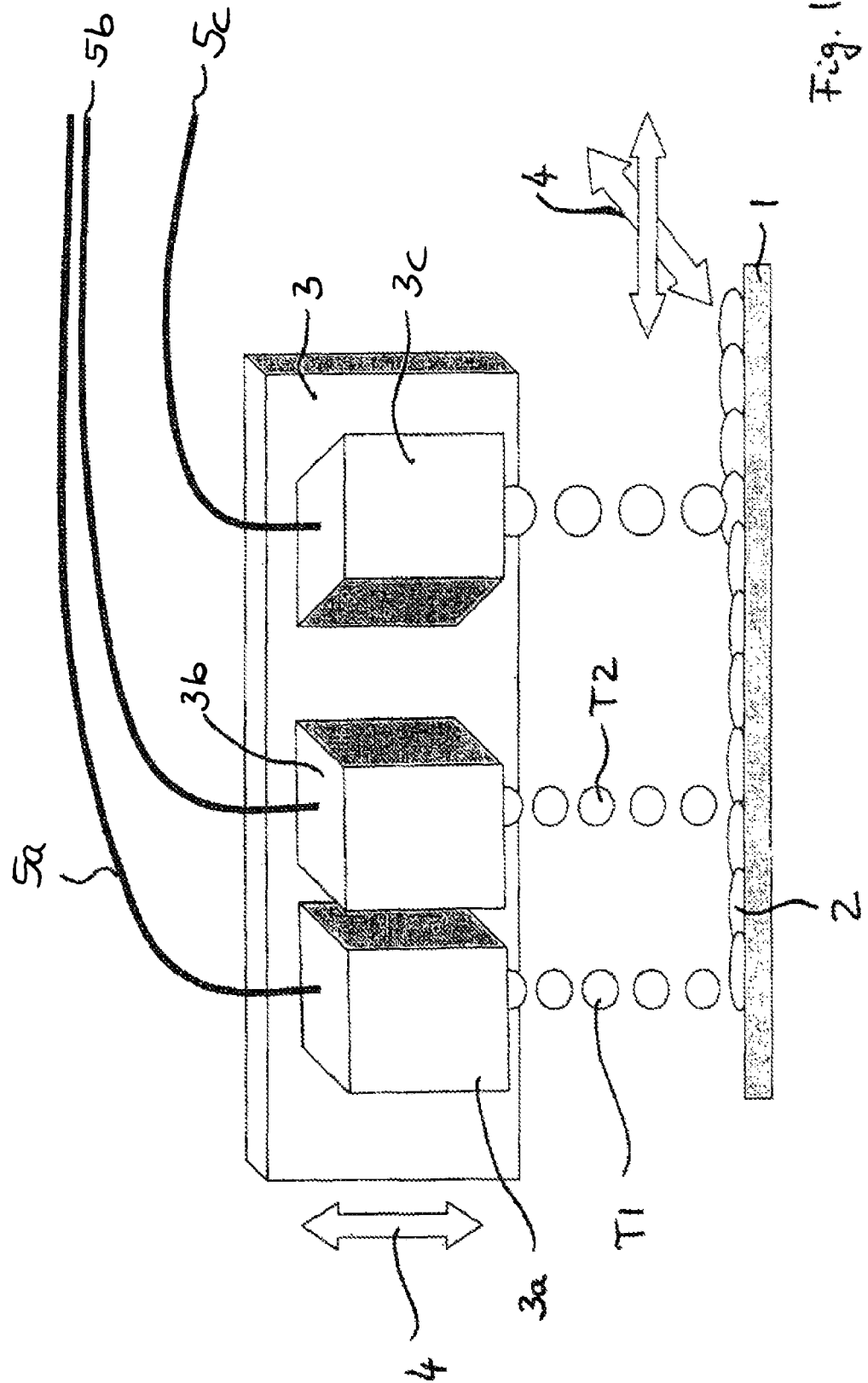

| | | | |
|---|---|---|---|
| 4,369,025 A | 1/1983 | Von Der Weid | |
| 4,575,330 A | 3/1986 | Hull | |
| 4,665,492 A | 5/1987 | Masters | |
| 4,752,352 A | 6/1988 | Feygin | |
| 4,863,538 A | 9/1989 | Deckard | |
| 4,938,816 A | 7/1990 | Beaman et al. | |
| 4,944,817 A | 7/1990 | Bourell et al. | |
| 5,017,753 A | 5/1991 | Deckard | |
| 5,053,090 A | 10/1991 | Beaman et al. | |
| 5,059,266 A | 10/1991 | Yamane et al. | |
| 5,076,869 A | 12/1991 | Bourell et al. | |
| 5,127,037 A | 6/1992 | Bynum | |
| 5,132,143 A | 7/1992 | Deckard | |
| 5,134,569 A | 7/1992 | Masters | |
| 5,136,515 A | 8/1992 | Helinski | |
| 5,140,937 A | 8/1992 | Yamane et al. | |
| 5,147,587 A | 9/1992 | Marcus et al. | |
| 5,149,548 A | 9/1992 | Yamane et al. | |
| 5,155,324 A | 10/1992 | Deckard et al. | |
| 5,156,697 A | 10/1992 | Bourell et al. | |
| 5,182,170 A | 1/1993 | Marcus et al. | |
| 5,204,055 A | 4/1993 | Sachs et al. | |
| 5,216,616 A | 6/1993 | Masters | |
| 5,248,456 A | 9/1993 | Evans, Jr. et al. | |
| 5,252,264 A | 10/1993 | Forderhase et al. | |
| 5,284,695 A | 2/1994 | Barlow et al. | |
| 5,296,062 A | 3/1994 | Bourell et al. | |
| 5,316,580 A | 5/1994 | Deckard | |
| 5,340,656 A | 8/1994 | Sachs et al. | |
| 5,342,919 A | 8/1994 | Dickens, Jr. et al. | |
| 5,352,405 A | 10/1994 | Beaman et al. | |
| 5,354,414 A | 10/1994 | Feygin | |
| 5,382,308 A | 1/1995 | Bourell et al. | |
| 5,387,380 A | 2/1995 | Cima et al. | |
| 5,431,967 A | 7/1995 | Manthiram et al. | |
| 5,482,659 A | 1/1996 | Sauerhoefer | |
| 5,490,962 A | 2/1996 | Cima et al. | |
| 5,506,607 A | 4/1996 | Sanders, Jr. et al. | |
| 5,555,176 A | 9/1996 | Menhennett et al. | |
| 5,573,055 A | 11/1996 | Melling et al. | |
| 5,597,589 A | 1/1997 | Deckard | |
| 5,616,294 A | 4/1997 | Deckard | |
| 5,639,070 A | 6/1997 | Deckard | |
| 5,639,402 A | 6/1997 | Barlow et al. | |
| 5,647,931 A | 7/1997 | Retallick et al. | |
| 5,658,412 A | 8/1997 | Retallick et al. | |
| 5,730,925 A | 3/1998 | Mattes et al. | |
| 5,740,051 A | 4/1998 | Sanders, Jr. et al. | |
| 5,753,274 A | 5/1998 | Wilkening et al. | |
| 5,807,437 A | 9/1998 | Sachs et al. | |
| 5,851,465 A | 12/1998 | Bredt | |
| 5,902,441 A | 5/1999 | Bredt et al. | |
| 5,902,537 A | 5/1999 | Almquist et al. | |
| 5,943,235 A | 8/1999 | Earl et al. | |
| 6,007,318 A | 12/1999 | Russell et al. | |
| 6,036,777 A | 3/2000 | Sachs | |
| 6,042,774 A | 3/2000 | Wilkening et al. | |
| 6,048,188 A | 4/2000 | Hull et al. | |
| 6,116,517 A | 9/2000 | Heinzl et al. | |
| 6,133,353 A | 10/2000 | Bui et al. | |
| 6,146,567 A | 11/2000 | Sachs et al. | |
| 6,147,138 A | 11/2000 | Hochsmann et al. | |
| 6,155,331 A | 12/2000 | Langer et al. | |
| 6,164,850 A * | 12/2000 | Speakman | 400/120.09 |
| 6,165,406 A * | 12/2000 | Jang et al. | 264/308 |
| 6,193,922 B1 | 2/2001 | Ederer | |
| 6,217,816 B1 | 4/2001 | Tang | |
| 6,259,962 B1 | 7/2001 | Gothait | |
| 6,305,769 B1 | 10/2001 | Thayer et al. | |
| 6,322,728 B1 | 11/2001 | Brodkin et al. | |
| 6,375,874 B1 | 4/2002 | Russell et al. | |
| 6,395,811 B1 | 5/2002 | Nguyen et al. | |
| 6,401,001 B1 | 6/2002 | Jang et al. | |
| 6,403,002 B1 | 6/2002 | Van Der Geest | |
| 6,416,850 B1 | 7/2002 | Bredt et al. | |
| 6,423,255 B1 | 7/2002 | Hoechsmann et al. | |
| 6,436,334 B1 | 8/2002 | Hattori et al. | |
| 6,467,525 B2 | 10/2002 | Herreid et al. | |
| 6,476,122 B1 | 11/2002 | Leyden | |
| 6,500,378 B1 | 12/2002 | Smith | |
| 6,554,600 B1 | 4/2003 | Hofmann et al. | |
| 6,610,429 B2 | 8/2003 | Bredt et al. | |
| 6,658,314 B1 * | 12/2003 | Gothait | 700/119 |
| 6,733,528 B2 | 5/2004 | Abe et al. | |
| 6,838,035 B1 | 1/2005 | Ederer et al. | |
| 7,004,222 B2 | 2/2006 | Ederer et al. | |
| 7,137,431 B2 | 11/2006 | Ederer et al. | |
| 2001/0050031 A1 | 12/2001 | Bredt et al. | |
| 2002/0026982 A1 | 3/2002 | Bredt et al. | |
| 2002/0111707 A1 | 8/2002 | Li et al. | |
| 2002/0167100 A1 * | 11/2002 | Moszner et al. | 264/16 |
| 2003/0083771 A1 | 5/2003 | Schmidt | |
| 2004/0012112 A1 | 1/2004 | Davidson et al. | |
| 2004/0035542 A1 | 2/2004 | Ederer et al. | |
| 2004/0056378 A1 | 3/2004 | Bredt et al. | |
| 2004/0094058 A1 | 5/2004 | Kasperchik et al. | |
| 2005/0017394 A1 | 1/2005 | Hochsmann et al. | |
| 2005/0167872 A1 | 8/2005 | Tsubaki et al. | |
| 2008/0001331 A1 | 1/2008 | Ederer | |

FOREIGN PATENT DOCUMENTS

| | | |
|---|---|---|
| DE | 4300478 | 8/1994 |
| DE | 4400523 | 7/1995 |
| DE | 4440397 | 9/1995 |
| DE | 19511772 A1 | 10/1996 |
| DE | 19723892 C1 | 9/1998 |
| DE | 19846478 C2 | 4/2000 |
| DE | 19853834 | 5/2000 |
| DE | 10047614 | 4/2002 |
| EP | 0361847 B1 | 4/1990 |
| EP | 0431924 B1 | 6/1991 |
| EP | 0688262 | 12/1995 |
| EP | 0711213 | 5/1996 |
| EP | 0734842 | 10/1996 |
| EP | 0739666 | 10/1996 |
| EP | 0968776 | 1/2000 |
| EP | 1163999 | 12/2001 |
| EP | 1415792 | 5/2004 |
| EP | 1442870 | 8/2004 |
| FR | 2790418 | 9/2000 |
| GB | 2382798 | 6/2003 |
| WO | 95/18715 A1 | 7/1995 |
| WO | 96/05038 A1 | 2/1996 |
| WO | 00/21736 A1 | 4/2000 |
| WO | 00/51809 A1 | 9/2000 |
| WO | 01/26885 A1 | 4/2001 |
| WO | 01/72502 A1 | 4/2001 |
| WO | 01/34371 A2 | 5/2001 |
| WO | 02/26419 A1 | 4/2002 |
| WO | 02/26420 A1 | 4/2002 |
| WO | 02/26478 A1 | 4/2002 |
| WO | 02/064353 A1 | 8/2002 |
| WO | 02/064354 A1 | 8/2002 |
| WO | 03/016030 A1 | 2/2003 |
| WO | 03/016067 A2 | 2/2003 |
| WO | 03/103932 A1 | 12/2003 |
| WO | 2004/010907 A1 | 2/2004 |
| WO | 2004/110719 A2 | 12/2004 |
| WO | 2004/112988 A2 | 12/2004 |

OTHER PUBLICATIONS

EOS Operating Manual for Laser Sintering Machine with Brief Summary.

Sachs et al., "Three-Dimensional Printing: Rapid Tooling and Prototypes Directly from a CAD Model", Massachusetts Institute of Technology, pp. 131-136.

Sachs et al., "Three-Dimensional Printing: Rapid Tooling and Prototypes Directly from a CAD Model", Massachusetts Institute of Technology, pp. 143-151.

Jacobs et al., 2005 SME Technical Paper, title "Are QuickCast Patterns Suitable for Limited Production?".

Feature Article—Rapid Tooling—Cast Resin and Sprayed Metal Tooling by Joel Segal.

Williams, "Feasibility Study of Investment Casting Pattern Design by Means of Three Dimensional Printing", Department of Machanical Enginerring, pp. 2-15.

Copending National Phase Application, WO 02/26419, Apr. 4, 2002.

Copending National Phase Application, WO 02/26420, Apr. 4, 2002.

Copending U.S. Appl. No. 11/320,050 (corresponds with PCT WO 02/26420), (US Patent No. 7,137,431), Dec. 28, 2005.

Copending National Phase Application, WO 03/103932, Dec. 18, 2003.

Copending National Phase Application, WO 04/112988, Dec. 8, 2005.

Copending U.S. Appl. No. 11/767,778, filed Jun. 25, 2007 (Published as 2008-0001331), Jun. 25, 2007.

Copending U.S. Appl. No. 10/866,205, (Published as 2005/0017394), Jun. 11, 2004.

International Search Report, WO 04/110719, Jan. 11, 2005.

International Search Report, WO 2005-113219, Dec. 1, 2005.

Gephart, Rapid Prototyping, pp. 118-119.

Marcus et al., Solid Freedom Fabrication Proceedings, Nov. 1993.

Opposition of Patent No. DE10047614, Jun. 25, 2003.

Opposition to European Patent No. 1322458 B1, Jan. 19, 2005.

International Search Report, PCT/DE00/03324, (Published as WO2002/026419), Jun. 5, 2001.

International Search Report, PCT/DE01/03661, (Published as WO2002/026420), Feb. 28, 2002.

International Search Report, PCT/DE01/03662, (Published as WO2002/026478), Mar. 1, 2002.

Marcus, et al., Solid Freeform Fabrication Proceedings, Sep. 1995, p. 130-33.

US 4,937,420, 06/1990, Deckard (withdrawn)

* cited by examiner

METHOD AND DEVICE FOR PRODUCTION OF A THREE-DIMENSIONAL ARTICLE

CLAIM OF BENEFIT OF FILING DATE

The present application claims the benefit of the filing date of PCT Application Ser. No. PCT/DE2005/000950, (filed May 24, 2005) (Published as WO 2005/113219) and DE 10 2004 025 374.9(filed May 24, 2004), the contents of which are hereby incorporated by reference in their entirety.

The patent refers to a process and a device for manufacturing a three-dimensional product from a material by means of layer by layer application.

These types of process are used for example to create models of three-dimensional bodies. This is also referred to a "Rapid Prototyping". "Rapid Prototyping" sums up the area of technology which is concerned with the fast and automatic generative manufacture of three-dimensional objects. Here a CAD model of the object to be manufactured is broken down into horizontal sections using an appropriate software program and the two-dimensional sections are then converted sequentially into real layers of the object in a suitable process, and the object is therefore configured fully in layers.

Established procedures which use high-frequency micro-drop dosing for prototyping three-dimensional plastic components, as they are implemented for example by means ink-jet nozzles, are 3D Printing (3DP), Ballistic Modeling (BPM) and Ink-Jet Printing.

3D Printing is described for example in the document U.S. Pat. No. 5,204,055. In this procedure a binding agent is dosed in drop form on a powder layer, so that the powder is cemented selectively according to the section information. Following application of the next powder coat the binding agent is selectively reapplied etc. The resulting component consists mainly of the applied powder; only the binding agent is applied using an ink-jet nozzle. For the purpose of plastic processing only view/design models can be made with this procedure. The resulting components do not bear any resemblance whatsoever to plastic serial parts as regards material properties.

In the documents U.S. Pat. Nos. 4,665,492, 5,134,569, 5,216,616 and 5,555,176 an established procedure is described as "Ballistic Particle Manufacturing" (BPM). In the procedure the actual construction material for the object is applied as particles or droplets using a 5-axial working dispenser on pre-hardened layers of the object. In order to make plastic components the following is described: the application of plastic particles in an ionized atmosphere, the application of photopolymer resin with a subsequent radiation measure for initiating polymerization and the use of a fusible construction material, which solidifies the component. The plastic models created are brittle. Due to the many movement possibilities of the dispenser, it is technically only very complex to position the dispenser in a sufficiently accurate way, and therefore expensive to put into practice. BPM has not won recognition in applications because of these serious disadvantages.

In the documents U.S. Pat. Nos. 5,059,266, 5,140,937 and 5,149,548 an ink-jet printing process is described. In this procedure a hardenable construction material is ejected using ink-jet nozzles located under the building platform against the force of gravity. In the second step the applied material is hardened by means of an energy input. Hardenable materials via light (cf. U.S. Pat. No. 5,059,266), hardenable materials via heat (cf. U.S. Pat. No. 5,140,937) or 2-component materials (cf. U.S. Pat. No. 5,149,548) can be used. In the 2-component materials, one component, the hardener, is dispersed homogeneously into the other component as a microcapsule. Following application onto a building platform used in manufacture, the microcapsules are destroyed using the additional input of energy and therefore the material hardens. This procedure makes it virtually impossible to implement overhangs/undercuts or other non-integral structures. Besides it is a 2-step procedure, there are extra energy sources, which involve increased costs, necessary to initiate a reaction. These grave disadvantages have meant that no commercial equipment has been developed on the principle of "against the gravitational force of printing".

In the document U.S. Pat. No. 5,136,515 an ink-jet printing process is described, in which three-dimensional objects are created by means of layered drop-by-drop application of two different hardenable materials. The materials have to be separable from one another in connection with the building process. The materials are different for the purpose of better separation, for example by various fusing points and their conduct with solvents. The actual object structure is made liquid-solid using a phase change conditional of temperature and/or by means of the following radiation hardening of the construction material. As an example a material is given wax.

In the documents U.S. Pat. Nos. 506,607, 5,740,051 and 6,305,769 detailed process technical implementations of the above-described procedure are described. This led to the development of commercially available ink-jet "wax" printing, for example Model Maker II® of Solidscape; Thermojet® of 3D-Systems The material mixtures used for prototyping the model are specified in the documents U.S. Pat. Nos. 6,395,811, 6,133,353, 6,582,613 and 6,476,122. In the materials the physical phase change is always fluid-solid the basis of the model configuration irrespective of the chemical composition (phase change solid imaging material). A radiation-induced crosslinking measure is taken, as described in the document US 2003/0083771.

Based on the high detail accuracy or liquidation the models created through wax printing are very well suited as a positive for investment-casting found and waste-wax casting. Due to the material properties of wax, in particular their brittleness and dimensional stability under heat, they are completely unsuitable for use as functional prototypes or serial parts.

Another ink-jet printing process is described in the document U.S. Pat. No. 6,259,962. A photopolymer is applied selectively using ink-jet nozzles and brought to a reaction in a second step using radiation. The procedure is expensive owing to the radiation source required and corresponding protection devices. Besides there is only a very limited material range, because the photopolymers must have a very low viscosity in order to be printable. Furthermore the use of fillers is avoided for pigment coating or improvement of material properties, as it prevents the light absorption needed for photopolymerization.

The document US 2002/0111707 A1 describes a process in which a fixed prepolymer mix is specifically deposited at room temperature as a liquefied material via ink-jet nozzles or vibration-controlled metering units. The reaction to the polymer is initiated by targeted temperature control, all necessary reaction components are located in the dosed prepolymer mix. The result should be linear polymers, predominantly polyamides. This process also involves a 2-step process: First the targeted release of material, then later the initiation of a reaction. It is to be expected that the temperature control described on the one hand results in an unwanted reaction in the dosage compounds, because all reaction partners are dosed by a nozzle at the same time. On the other hand the contour accuracy is affected in a negative way, as a reheating of the contour already deposited leads to melting.

Moreover a process is established from the document GB 2,382,798 A, in which using a jet assembly that includes the ink jet print heads, two fluids are released drop by drop to make a three-dimensional product, so that the fluids chemically react with each other after contact between both, in order to form a material whose properties differ from those of separate fluids. The printed circuits are made using the process described. The fluids applied in drops can be expelled using the jet assembly, so that drops of both fluids come into contact with one another 'in flight' or on initial impact.

From the document WO 03/016030 A1 a process to manufacture a three-dimensional product is established according to a model of the item with the aid of layer application. In the process a layer is formed from an initial material. The initial material can be a powder or a fluid. Then a second material is applied in drops on the coating of the first material. This is in line with the product model. These process steps are repeated several times in order to make the three-dimensional product. The three-dimensional item results from a layered application, in which chemical binding agents are also formed between the layers. The droplets of the second material can be achieved in line with different samples on the coating from the first material using the jet assembly, in order to diversify microscopic or macroscopic properties of the three-dimensional item. For example, through this, mechanical properties of the manufactured item can be varied here. In addition to the droplets of the second material droplets of another material can be expelled using a jet assembly and applied to the coating of the first material, whereby such fluid droplets can coincide in flight or on the surface of the coating from the first material. As regards the manufactured item the properties of at least some of the applied coats can vary within the coat, and/or the properties of the material differ from layer to layer in the item.

In the document WO 02/064353 A1 a process to manufacture a three-dimensional product is established according to a model of the item with the aid of layer application. In the established process a second fluid is applied drop by drop to the fluid coating of a first material with a viscosity ranging between 2 to 500 cps at room temperature.

Similarly in the document WO 02/064354 A1 a process to manufacture a three-dimensional product is described using layered drop by drop application. Unlike the above-named processes the coating from the first material is formed using a powder material.

The task of this patent is to specify a better process and better equipment to manufacture a three-dimensional product from a material using layered application, in which as much variation as possible of material properties of the three-dimensional item can be achieved.

This task is tackled with a process in line with the independent claim 1 as well as equipment in line with the independent claim 17.

The patent comprises ideas to propose a process to manufacture a three-dimensional product from a material using layered application, in which:

a. a drop by drop application is made, whereby drops of reaction components are expelled using a jet assembly and applied on a basic reaction component;

b. the material for the three-dimensional item is formed, and when exposed the basic reaction component reacts with the reaction components respectively, whereby the material in a reaction of basic reaction component with one of the reaction components is formed as a material with a material property and in another reaction of the basic reaction component with another of the reaction components as a material with another material property, whereby the steps a. and b. are repeated to form the three-dimensional item; and c. an item section is created with a gradual transition between the one material property and the other material property, by:

c1. in an end range of the item section in drop by drop application, initial reaction parameters for the drops of the one reaction component and drops of the other reaction components are set, so that in the end range of the item section after drop by drop application the material is formed predominantly or solely with the one material property;

c2. in a contrasting end range of the item section in drop by drop application, second reaction parameters for the drops of the one reaction component and drops of the other reaction component are set, so that in the other end range of the item section after drop by drop application the material is formed predominantly or solely with the other material property; and c3. in an intermediate range of the item section between both end ranges in shifting the jet assembly from the end range to the contrasting end range in drop by drop application, changeable intermediate reaction parameters for the drops of the one reaction component and the drops of the other reaction component are set, so that a gradual transition is made between the first reaction parameters and the second reactions parameters.

According to another aspect of the patent, equipment to run a procedure to manufacture a there-dimensional item from a material using layer application is proposed, whereby the equipment has the following features:

a construction mount to hold the item in manufacture;

a jet assembly to run a drop by drop application, in which drops of reaction components are expelled using the jet assembly and applied on a basic reaction component, arranged on a substrate, so that the material is formed for the three-dimensional item, when on contact the basic reaction components reacts with the reaction components respectively, whereby the material is formed in a reaction of the basic reaction component with one of the reaction components as a material with a material property and in another reaction of the basic reaction component with another of the reaction components as a material with another material property;

a shifting mechanism, which is connected relatively to the jet assembly and/or the construction mount to shift the jet assembly and the construction mount in drop by drop application; and Control means to control the shifting mechanism and the jet assembly in layer applications, so that an item section can be created with a gradual transition between the one material property and the other material property, in which:

in an end range of the item section in drop application initial reaction parameters for the drops of the one reaction component and drops of another reaction component can be set, so that in the end range of the item section after drop by drop application the material is formed predominantly or solely with the one material property;

in a contrasting end range of the item section in drop by drop application, second reaction parameters for the drops of the one reaction component and drops of another reaction component are set, so that in the other end range of the item section after drop by drop application the material is formed predominantly or solely with the other material property; and in an intermediate range of the item section between both end ranges in shifting the jet assembly from the end range to the contrasting end range in drop by drop application, changeable intermediate reaction parameters for the drops of the one reaction component and the drops of the other reaction component are set, so that a gradual transition can be made between the first reaction parameters and the second reactions parameters.

Compared with established procedures for making three-dimensional items the patent has the advantage of being able to create one or more item sections in the manufacture of the item, in which a gradual transition can be formed between two different material properties of the material used to make the item. This makes it possible to create the transition between one somewhat rigid material section and one rather elastic deformable section of the manufactured three-dimensional item in the item section with the gradual transition. The process and equipment can be implemented cost effectively, as commercially available pressure nozzles can be used, for example, for drop dosing. These do not require additional costly technology to control the basic reaction component and the reaction components.

There is also the advantage of the gradual transition being restricted locally or being able to be distributed over the entire item. Moreover it is possible to make one or several gradual transitions in the item.

Favourable embodiments of the process are the subject of independent subordinate claims.

Figure 2:
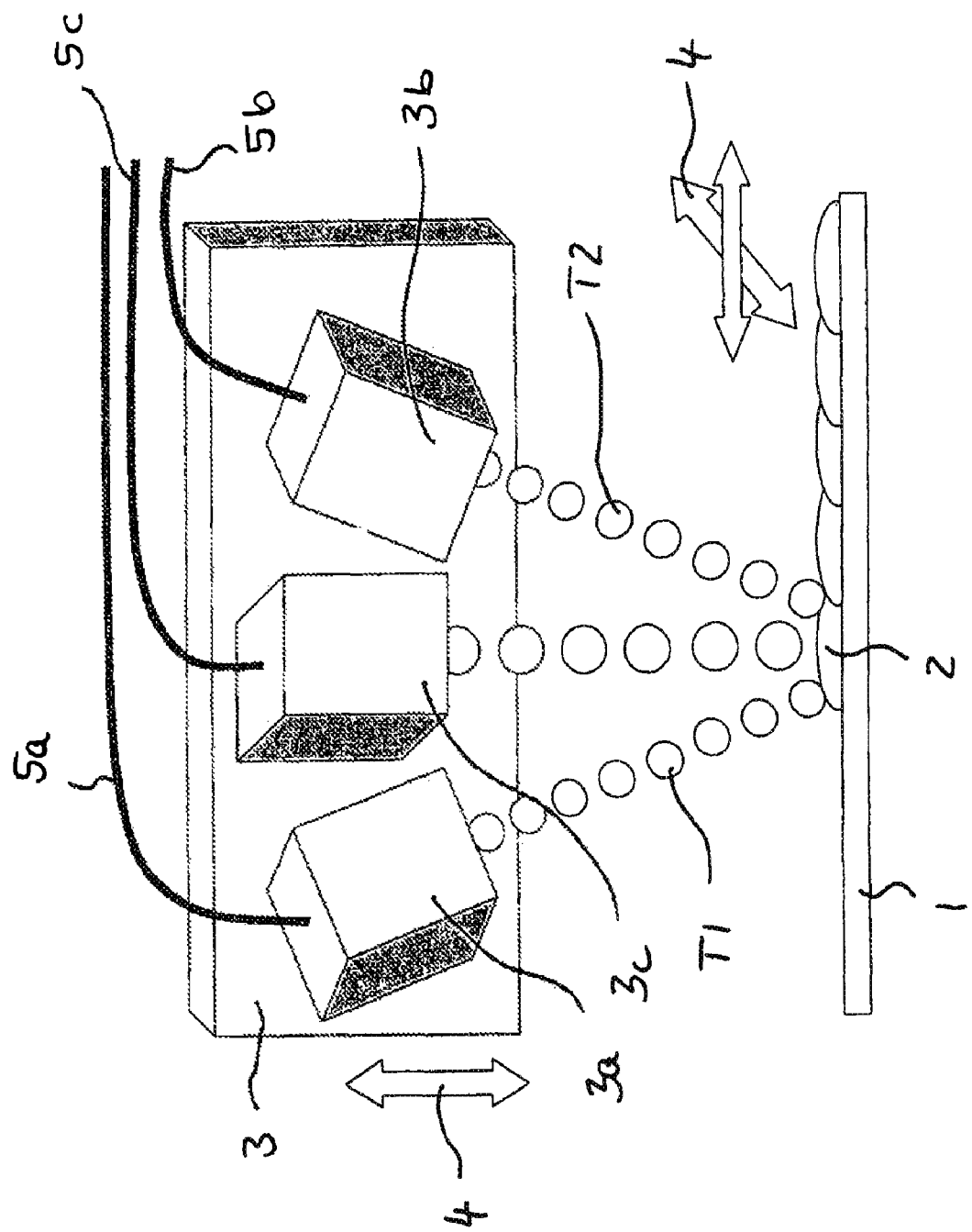
Figure 3:
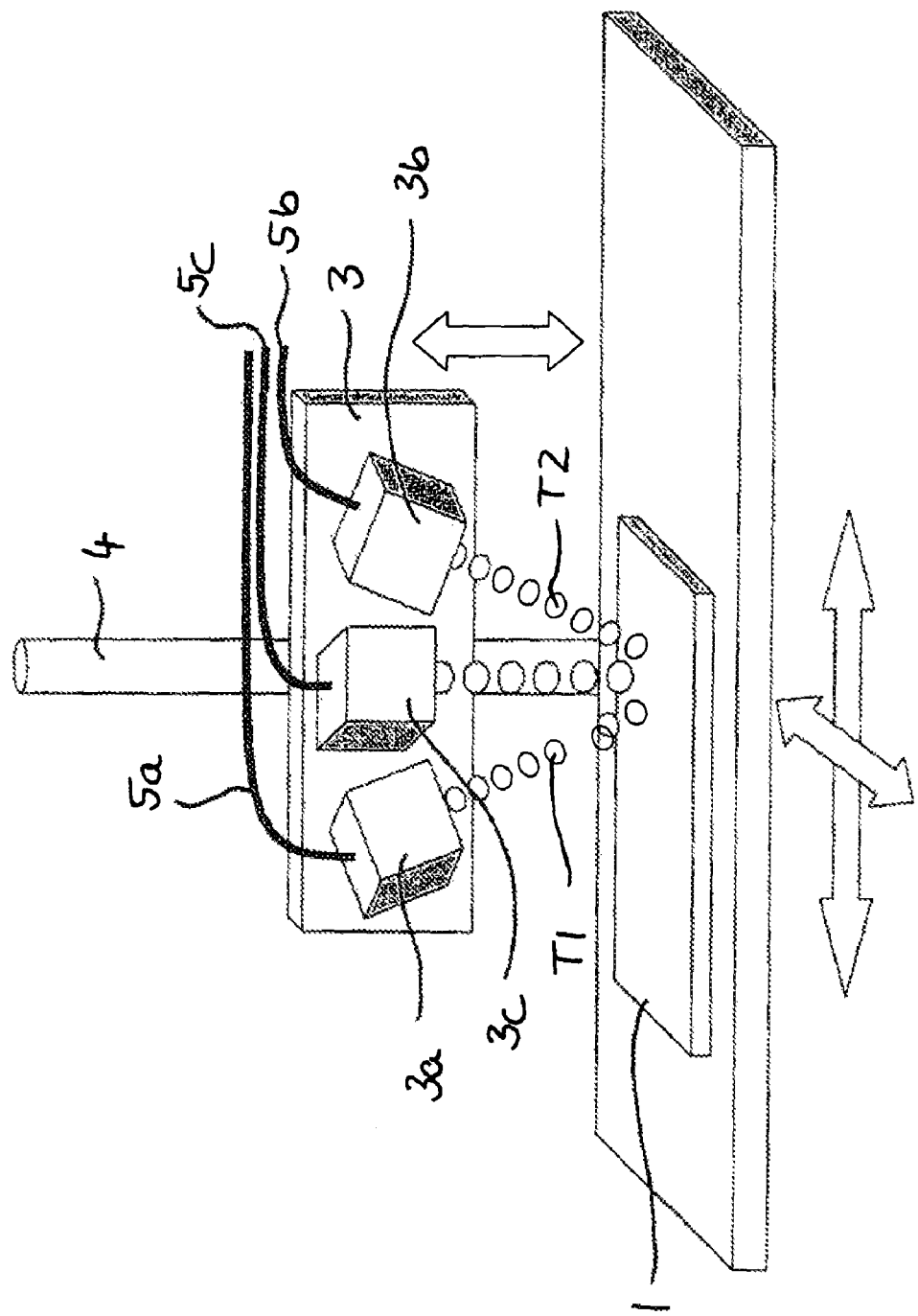

The patent is discussed below on the basis of the examples with reference to the diagram. Hereby representing:

FIG. 1 a schematic diagram of equipment to make a three-dimensional item using drop by drop application;

FIG. 2 a schematic diagram of other equipment to make a three-dimensional item using drop by drop application;

FIG. 3 a perspective diagram of equipment as per FIG. 2 and

Figure 4:
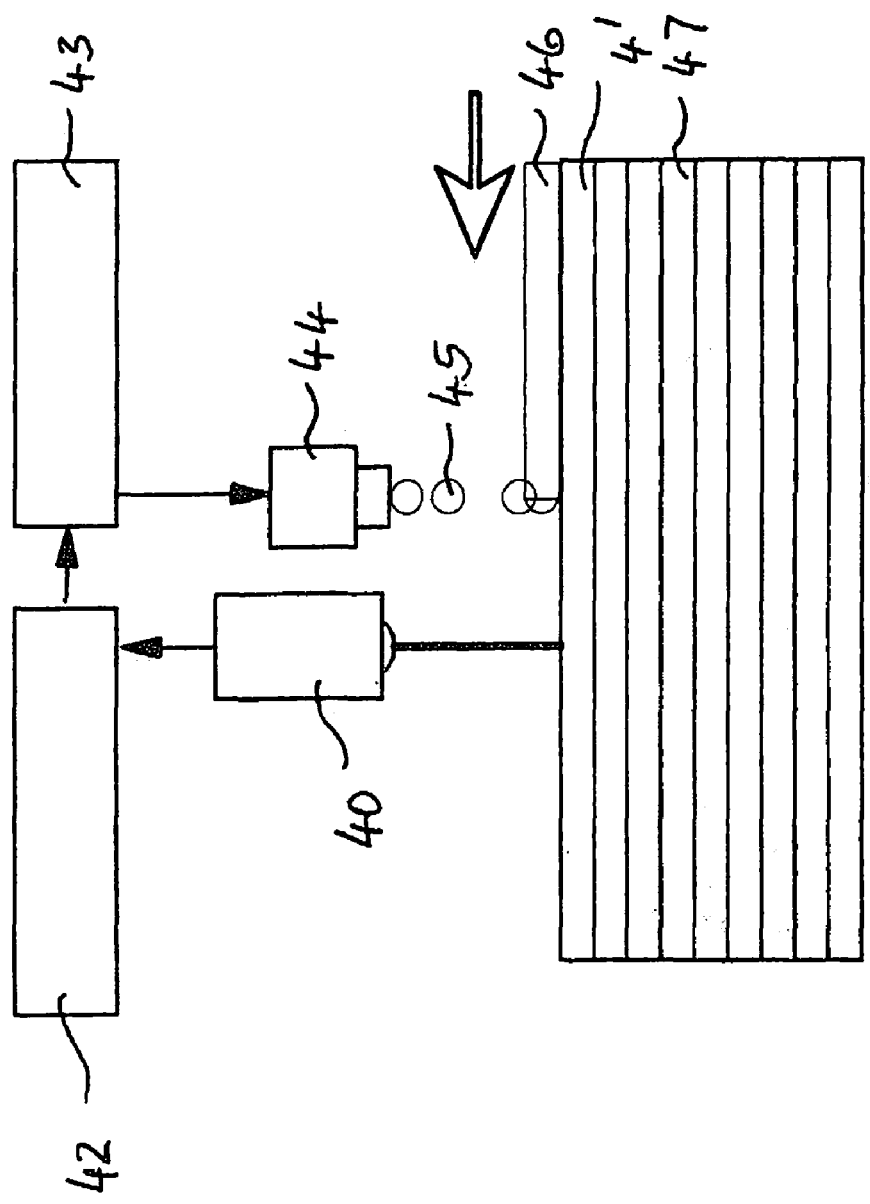

FIG. 4 a schematic diagram to illustrate a process, for which, during layered application, the layer thickness of applied layers is controlled subject to measuring data for a pre-applied layer.

a schematic diagram of equipment to make a three-dimensional item using drop by drop application; A coating 2 of a basic reaction component B is applied to a building platform. Using a jet assembly 3, which comprises two nozzles 3a, 3b, drops T1 of a reaction component R1 as well as drops T2 of another reaction component R2 are applied to the coat 2 of the basic reaction component B. The jet assembly 3 moves over the coat 2 of the basic reaction component B, for which a shifting mechanism 4 represented in FIG. 1, which is activated using electronic control signals and illustrated in FIG. 1 using arrows. The nozzles 3a, 3b, 3c based on using inkjet print heads, are connected via control lines 5a, 5b, 5c to a control device (not illustrated), so that the application of drops using control signals transmitted over the control lines 5a, 5b, 5c can be controlled. The reaction components R1, R2 and the basic reaction component B are fed over supply lines from store containers to the nozzles 3a, 3b, 3c respectively, which can be integrated in the jet assembly 3 or separated. In order to form the three-dimensional item the described layer application is repeated.

FIG. 3 shows a schematic diagram of another device to make a three-dimensional item using drop by drop application; The same features are named in FIG. 2 with the same reference numbers as in FIG. 1. Unlike the equipment, according to FIG. 1 both nozzles 3a, 3b in the other equipment according to FIG. 2 are arranged so that the drops T1 of reaction component R1 and drops T2 of reaction component R2 are essentially in a similar range to layer 2 of basic reaction component B. The direction that the nozzles 3a, 3b are released can be set in such a way that the drops T1 of reaction component R1 and the drops T2 of reaction component R2 coincide with one another before reaching layer 2 of the basic reaction component B. In this way it is possible to apply one drop T1 of reaction component R1 together with one drop T2 of reaction component R2 on the layer of basic reaction component B. Alternatively it is also possible for one drop T1 of reaction component R1 and one drop T2 of reaction component R2 to be applied in a defined time interval to one another on one and the same range of layer 2, for example one and the same drops of basic reaction component B.

Using the equipment as per FIG. 1 as well as the other equipment as per FIG. 2 it is possible, when applying a layer to expose one drop of one range of basic reaction component B to the building platform with different quantities of reaction component R1 and reaction component R2. By using nozzles 3a, 3b the drop size expelled can be controlled. Furthermore, for drops T1 or reaction component R1 and drops T2 of reaction component R2, other reaction parameters can also be set individually, for example the temperature, the rate of output and/or the individual chemical composition. In this way it possible to vary the physical and/or chemical properties in sections of the item made layer by layer, so that a gradual transition is formed between two material properties. For instance the item made within an applied layer and/or via several layers can show one or several transitions between one somewhat rigid material and one rather elastic deformable material.

FIG. 3 shows the other equipment as per FIG. 2 in another embodiment, with which the jet assembly 3 can be moved in the direction of z and the building platform 1 in the direction of x and y using the shifting mechanism 4, in order to allow the relative movement of jet assembly 3 to building platform 1 needed for layered application. In FIG. 3 the same features are identified with the same reference names as in FIGS. 1 and 2.

A three-dimensional plastic component is produced using selective layer by layer application of two reaction components R1 and R2 in fluid form on the basic reaction component B, whereby the reaction components R1, R2 react on contact with the basic reaction component B, and in the reaction of reaction components R1 with basic component B a material M1 is formed with a material property E1 and in the reaction of reaction components R2 with the basic component B the material M1 is formed with a material property E2. In the appropriate selection of basic reaction component B the reaction components R1, R2 provision can also be made that in the reaction of reaction components R2 with the basic reaction components B another material MR is formed with the material property E2, whereby material M1 and the other material M2 are compatible with each other. Material M1 and the other material M2 are fixed crosslinked plastics.

The basic reaction component B can exist as a material compound, which contains a filler material such as fibre glass, micro balls or similar, in order to affect material properties of the material made. The compound could even be changed so that the predominant share is formed from filler material, for example a filler in particle form. This has two effects: on the one hand the material properties can be affected in targeted way and on the other hand the material quantity to be dosed for volume hardening is reduced, the process to make the three-dimensional item builds up significantly faster. A filler material could only be coated with the basic reaction component B. The material compound can be free-flowing or paste form. The basic reaction component B can be applied by means of scraping or application with established coating methods such as rolling, coating, spraying, sprinkling, whetting. The application of reaction components R1 and R2 is made selectively.

Necessary coating information in layered images of the three-dimensional item are generated as per the current Rapid Prototyping process directly from CAD construction data of the item to be produced. Through the control data obtained in this way the jet assembly 3 and building platform 1 are moved relative to one another and the drop output of nozzles 3a, 3b controlled. The nozzles 3a, 3b of the jet assembly 4 are connected with temperature-controlled supply containers, which contain the reaction components R1, R2 and if necessary the basic reaction component B.

In accordance with the embodiment the manufacturing process comprises the following measures:
a) In a constructed space with controllable temperature and constructed space atmosphere the building platform 1 movable towards z is located in a tank, which is filled with basic reaction component B, so that via construction platform 1 a coating of basic reaction component B consists of a defined thickness.
b) According to the control data using the temperature-controlled jet assembly 3 movable in direction of x and y, the reaction components R1, R2 are applied selectively on the construction platform 1. A chemical reaction of basic reaction component B with one or both reaction components R1, R2 results in an initial coating of the item to be produced.
c) Then the construction platform 1 is lowered, so that a coating of the basic reaction component B of a defined thickness is produced over the first coating of the component. The process step b) is then performed.
d) The step c) is repeated several times, until the entire item is produced.

The basic reaction component B and the reaction components R1, R2 are coordinated in terms of their thickness, so that excess shares of the basic reaction component B and/or of reaction components R1, R2 in the tank assume a supporting function for overhangs of the item.

According to another embodiment the manufacturing process comprises the following measures:
a) In a construction space with controllable temperature and construction space atmosphere the construction platform 1 movable in the direction of z and the jet assembly 3 movable in the direction of x and y are arranged with temperature-controlled ink jet nozzles, whereby a nozzle with the supply container for the basic reaction component B, another nozzle with the supply container for the reaction component R1 and another nozzle with the supply container for the reaction component R2 are connected, so that the basic reaction component B, the reaction component R1 and the reaction component R2 can be applied drop by drop.
b) According to the control data the nozzles apply the basic reaction component B, the reaction component R1 and the reaction component R2 in such a way that by means of the ensuing chemical reactions of basic reaction component B with the reaction component R1 and/or the reaction component R2 the outcome is an initial coating of the item to be produced.
c) The construction platform 1 is lowered by a layer thickness.
d) The process step b) is repeated until the entire item is produced.

Both reaction components R1, R2 can be deposited on one and on the same drops of basic reaction component B. This can be placed isochronously or chronologically. "Controllable temperature" in the construction space implies that the entire construction space or parts thereof are held at a defined temperature. The term "controllable construction space atmosphere" in the meaning used here, describes that the type of atmosphere, thus for example air or nitrogen or argon, can be set.

The basic reaction component B and the fluid reaction component R1, R2 each form reaction systems, which produce a fixed crosslinked plastic through chemical reaction with one another. The preferred reactions from the build up of polymers is the polyaddition reaction. Plastics produced preferentially are polyurethenes, as polymers, which are made according to di (or poly) isocyanate polyaddition methods and mostly contain the urethane group as a characteristic structure element.

The basic reaction component B contains higher molecular oligomers and/or prepolymers, which show at least two hydrogen atoms reactive against isocyanates, which stem from the group of primary alcohols, secondary alcohols, phenols, primary amines and/or secondary amines. Worth mentioning are polyols selected from the group polyether polyols and polyester polyols, as they are obtained from the addition of alkyl oxides, such as ethylene oxide and propylene oxide, to multifunctional starter, such as ethylene glycol, propylene glycol, glycerin, trimethylol propane, sucrose, sorbital, and/or ethylenediamine, or through condensation of dicarbon acid, such as adipic acid, succinic acid, glut acid, cork acid, sebacic acid, maleic acid and/or glutar acid, with predominantly bifunctional hydroxy components, such as ethylene glycol and/or propylene gycol, structured from ethylene oxide and/or propylene oxide such as glycerin, trimethylol propane, ethyl diamine, propylene glycol, ethylene glycol, sorbital or their mix as a starter.

The reaction components R1, R2 contain organic polyisocyanates and/or polyisocyanate prepolymers, whereby the self-established aliphatic, cycloaliphatic, araliphatic and preferably aromatic polycylic isocyanates or isocyanates disguised through reaction. Tolulyenediisocyanates and Diphenylmethandiisocyanates, their modification product and their corresponding prepolymers are particularly suited. Aromatic polyisocyanages are referred to in particular: 4.4' diphenyl-methandiisocyanate, compositions from 2.4'- and 4.4'-diphenylmethandiisocyanate, raw MDI types or polymer MDI and/or 2.4 and/or 2.6 toluylenediisoyanate as well as their compositions among each other.

Both the basic reaction component B and the reaction components R1, R2 can contain supplements and additives, such as catalysts/activators, chain extenders, cross linking agents, stabilizers and filling material in addition to actual reaction partners.

As a basic reaction component B, by way of an example, the isocynate lupranate M20W from the company Elastogran GmbH, Lemförde can be used in the above described embodiment for the manufacturing method, added to 0.1-5% of suitable catalysator. Lupranol 330, manufactured by Elastogran GmbH, is used as reaction component R1. Reaction component R2 is Lupranol 1100 in this embodiment. The construction temperature is between 25 and 70° C., the nozzle operating temperature is between 50 and 90° C.

It may be the case that in contact another treatment of the layer assembly formed is added to the reaction between the basic reaction component B and the reaction component R1 and/or the reaction between basic reaction component B and the reaction component R2, for example a light radiation or heating, to achieve further hardening until thermosetting of the material. The post treatment can result in the reaction of reaction pairs started on exposure being continued or another reaction being initiated.

FIG. 4 shows a schematic diagram to illustrate a process, for which, during layered application the layer thickness of a coat actually applied is controlled subject to measuring data for the layer thickness of a pre-applied layer. For this purpose, using an interval measuring device 40 measuring data is recorded, which allows conclusions to be drawn on the thickness of a last coating applied 41. The interval measurement is preferably carried out using an optical interval measuring process. The measuring data is transferred to an evaluation device 42, which evaluates the measuring data. Control signals are then transferred from the evaluation device 42 to a control device 43, which is coupled with a jet assembly 44. Based on control signals jet control signals are produced in the control device 43 and transferred to the jet assembly 44, in order to control the jet assembly 44 depending on the measured data recorded using the interval measuring device 40. This way the volume of drops expelled 45 in applying an actual layer 46 can be reduced, if it is determined that the thickness of the last coat applied 41 is greater than originally intended. Vice versa the volume of drops 45 can be enlarged if the last coat applied 41 is too thin. With the aid of the process described, continual monitoring of an exact formation of layers is ensured throughout the entire layer application to form a three-dimensional item 47.

The process described associated with FIG. 4 for automatic monitoring of layer thickness can not only be used in connection with all process variants and devices, which have been described with reference to FIGS. 1 to 3, but also with any other process to form three-dimensional items by means of layered application. Layer by layer application can be made using a reaction system from basic reaction component and reaction component. If required another reaction system from basic reaction component and another reaction component can be used, as described above. The application of basic components can be in drops or in layers.

The patent features revealed in the previous description, claims and diagram, both individually and in any combination for realizing the patent in its various embodiments, can be significant.

Synopsis

The patent refers to a process and a device for making a three-dimensional item from a material by means of layer by layer application. A drop by drop application is made in the process, in which drops of reaction components are expelled using a jet assembly, and applied on a basic reaction component, which is arranged on a substrate. The material for the three-dimensional item is formed in layers, and upon contact, the basic reaction component reacts with the reaction components respectively, whereby the material in a reaction of basic reaction component with one of the reaction components is formed as a material with a material property and in another reaction of the basic reaction component with another of the reaction components as a material with another material property. In making the three-dimensional item an item section is produced, in which a gradual transition is formed between the one material property and the other material property.

The invention claimed is:

1. A method of manufacturing a three-dimensional item using a layer by layer application onto a building platform comprising:

a. applying a drop by drop application from a jet assembly;
   b. creating a first material property by reacting a first reaction component and a basic component;
   c. creating a second material property by chemically reacting a second different reaction component and the basic component; and
   d. repeating steps a, b, and c several times to form the three-dimensional item;
      wherein the three-dimensional item has a first end comprised predominately of the first material property, a second end comprised predominately of the second different material property, and an intermediate area in-between the first end and the second end containing both the first material property and the second different material property so that a gradual transition between the first end and the second end is made.

2. The method of claim 1, wherein the basic component is exposed to the first reaction component and the second different reaction component during creation of the intermediate area.

3. The method of claim 1, wherein the drops of the basic component and drops of the first reaction component and the second different reaction component are exposed to one another in flight.

4. The method of claim 1, wherein the basic component is coated by drops of the first reaction component and the second different reaction component.

5. The method of claim 1, wherein the intermediate area is one layer.

6. The method of claim 1, wherein the intermediate area includes multiple layers.

7. The method of claim 1, further including the step of setting a drop volume for the first reaction component or the second different reaction component, for drop by drop application, that creates the first end, the second end, and the intermediate area.

8. The method of claim 1, wherein a chemical composition of either the first reaction component or the second different reaction component is set when parameters for the first end, the second end, and the intermediate area are being set.

9. The method of claim 1, further including the step of setting a time delay for expelling drops of either the first reaction component or the second different reaction component, wherein the time delay is set when parameters for the first end, the second end, and the intermediate area are being set.

10. The method of claim 1, further including the step of setting a power for expelling drops of either the first reaction component or the second different reaction component, wherein the power is set when parameters for the first end, the second end, and the intermediate area are being set.

11. The method of claim 1, wherein the basic component and the first reaction component form a fixed crosslinked plastic upon reaction, and the basic component and the second reaction component form a fixed crosslinked plastic upon reaction.

12. The method of claim 11, wherein the fixed crosslinked plastic is formed by a polyaddition reaction.

13. The method of claim 11, wherein the basic component further includes at least one material or blend selected from the group of divergent organic polyisocyanate, modified organic polyisocyanate, or polyisocanate prepolymers.

14. The method of claim 1, wherein the basic component and either the first reaction component or the second different reaction component has a viscosity between about 0.5 and about 50 mPa·s and a surface energy between about 20 and about 70 mN/m at a predetermined dosing temperature.

15. A method for the production of a three dimensional article from a material, the method comprising:
   a. ejecting a plurality of base component drops from a first nozzle onto a construction platform in a predetermined pattern that includes at least two hydrogen atoms reactive against isocyanates;
   b. ejecting a plurality of initial reaction component drops with a second nozzle unto the base component drops in a predetermined pattern that includes at least an organic polyisocyanate, a polyisocyanate prepolymer, or a combination thereof;
   c. ejecting a plurality of different initial reaction component drops with a third nozzle unto at least the base component drops in a predetermined pattern that includes at least an organic polyisocyanate, a polyisocyanate prepolymer, or a combination thereof;
   d. repeating steps a through c for producing individual layers until the three dimensional article is complete; and
   e. controlling temperature and volume of the base component drops, the initial reaction component drops, and the different initial reaction component drops;
   wherein the base component drops, initial reaction component drops, and different initial reaction component drops are ejected in a predetermined volume;
   wherein a first material property is produced when the initial reaction component drops react with the base component drops;
   wherein a second material property is produced when the different initial reaction component drops react with the base component drops;
   wherein the three dimensional article has a first end comprised of the first material property and a second end comprised of the second material property and an intermediate area between the first end and the second end that has a gradual transition between the first material and the second material; and
   wherein the complete three dimensional article includes crosslinked plastics being formed with the aid of a polyaddition reaction.

16. The method of claim 15, wherein the basic component drops are comprised at least partially of a filler material selected from glass fiber, glass micro-balls, carbon fiber, clay, talc, mineral, or a combination thereof.

17. The method of claim 15, further comprising the step of varying the volume of the initial reaction component drops and the different initial reaction component drops released from the first nozzle and the second nozzle based upon the thickness of the previous individual layer until the three dimensional article is complete.

18. The method of claim 15, wherein the nozzles have a temperature between 50° C. and 90° C.

19. The method of claim 15, further comprising the step of setting a temperature and humidity, wherein the construction of the three dimensional article is performed in a controllable atmosphere.

20. A method for producing a three dimensional article comprising:
   a. ejecting a plurality of base component drops, with a predetermined volume, from a first nozzle unto a construction platform in a predetermined pattern that includes at least two hydrogen atoms reactive against isocyanates;
   b. ejecting a plurality of initial reaction component drops, with a predetermined volume, with a second nozzle unto the first drops in a predetermined pattern that includes at least an organic polyisocyanate, a polyisocyanate prepolymer, or a combination thereof;
   c. ejecting a plurality of different initial reaction component drops, with a predetermined volume, with a third nozzle unto at least the first drops in a predetermined pattern that includes at least an organic polyisocyanate, a polyisocyanate prepolymer, or a combination thereof;
   d. repeating steps a through c for producing individual layers until the three dimensional article is complete;
   e. applying a predetermined pressure to the first nozzle, the second nozzle, and the third nozzle at predetermined times;
   f. controlling the volume of the base component drops, the initial reaction component drops, and the different initial reaction component drops;
   g. controlling temperature of the first nozzle, second nozzle, and third nozzle, wherein the temperature of the first nozzle, second nozzle, and third nozzle are between 50° C. and 90° C.;
   h. controlling the construction atmosphere around the construction platform, wherein the temperature and humidity are controlled; and
   i. varying the volume of the initial reaction component drops and the different initial reaction component drops released from the first nozzle and the second nozzle based upon the thickness of the previous individual layer until the three dimensional article is complete;
   wherein a first material property is produced when the initial reaction component drops react with the base component drops;
   wherein a second material property is produced when the different initial reaction component drops react with the base component drops;
   wherein the three dimensional article has a first end comprised of the first material property and a second end comprised of the second material property and an intermediate area between the first end and the second end that has a gradual transition between the first material property and the second material property; and
   wherein the complete three dimensional article includes a crosslinked polymeric structure.

* * * * *